United States Patent
Cui et al.

(10) Patent No.: US 12,221,379 B2
(45) Date of Patent: Feb. 11, 2025

(54) METHOD FOR PREPARING NON-SINTERED SHELL-WRAPPED CERAMSITE USING SOLID WASTE MEANWHILE IMMOBILIZING HEAVY METAL IN RIVER SEDIMENT, AND NON-SINTERED RIVER-SEDIMENT-BASED CERAMSITE

(71) Applicant: SHENZHEN UNIVERSITY, Shenzhen (CN)

(72) Inventors: Hongzhi Cui, Shenzhen (CN); Dapeng Zheng, Shenzhen (CN); Qiangwei Pang, Shenzhen (CN); Yu Jin, Shenzhen (CN); Yuan Fang, Shenzhen (CN)

(73) Assignee: SHENZHEN UNIVERSITY, Guangdong (CN)

( * ) Notice: Subject to any disclaimer, the term of this patent is extended or adjusted under 35 U.S.C. 154(b) by 0 days.

(21) Appl. No.: 18/633,658

(22) Filed: Apr. 12, 2024

(65) Prior Publication Data
US 2024/0343645 A1    Oct. 17, 2024

(30) Foreign Application Priority Data

Apr. 14, 2023    (CN) .......................... 202310395804.5

(51) Int. Cl.
| | | |
|---|---|---|
| *C04B 18/02* | (2006.01) | |
| *B09B 3/27* | (2022.01) | |
| *B09B 3/70* | (2022.01) | |
| *C04B 18/04* | (2006.01) | |
| *C04B 20/10* | (2006.01) | |
| *C04B 28/06* | (2006.01) | |
| *B09B 101/90* | (2022.01) | |
| *C04B 111/00* | (2006.01) | |

(52) U.S. Cl.
CPC ............ *C04B 18/0472* (2013.01); *B09B 3/27* (2022.01); *B09B 3/70* (2022.01); *C04B 18/021* (2013.01); *C04B 28/065* (2013.01); *B09B 2101/90* (2022.01); *C04B 2111/00732* (2013.01)

(58) Field of Classification Search
CPC . C04B 18/0472; C04B 18/021; C04B 28/065; C04B 2111/00732; B09B 3/27; B09B 3/70; B09B 2101/90
See application file for complete search history.

(56) References Cited

FOREIGN PATENT DOCUMENTS

CN    113105169 A    *    7/2021

OTHER PUBLICATIONS

Chinese First Office Action dated Jul. 11, 2023 in corresponding Chinese Application No. 202310395804.5.

* cited by examiner

*Primary Examiner* — Shuangyi Abu Ali
(74) *Attorney, Agent, or Firm* — Harness, Dickey & Pierce, P.L.C.

(57) ABSTRACT

Disclosed are a method for preparing a non-sintered shell-wrapped ceramsite using solid waste meanwhile immobilizing a heavy metal in river sediment, and a non-sintered river-sediment-based shell-wrapped ceramsite, which relate to the technical field of building materials. The disclosure combines river sediment with a solid waste powder and an alkali activating powder material, and adopts multiple-step granulations to realize particle size control and physical pore formation, thereby obtaining a non-sintered ceramsite. A sulfoaluminate cement and a Portland cement are used to encapsulate the non-sintered ceramsite and form a shell by wrapping, thereby preparing a non-sintered river-sediment-based shell-wrapped ceramsite with internal porosity and dense shell.

5 Claims, 9 Drawing Sheets

METHOD FOR PREPARING NON-SINTERED SHELL-WRAPPED CERAMSITE USING SOLID WASTE MEANWHILE IMMOBILIZING HEAVY METAL IN RIVER SEDIMENT, AND NON-SINTERED RIVER-SEDIMENT-BASED CERAMSITE

CROSS REFERENCE TO RELATED APPLICATION

The present application claims priority to Chinese Patent Application No. 202310395804.5, entitled "Method for preparing non-sintered shell-wrapped ceramsite using solid waste meanwhile immobilizing heavy metal in river sediment, and non-sintered river-sediment-based ceramsite", and filed with the China National Intellectual Property Administration on Apr. 14, 2023, the disclosure of which is incorporated by reference herein in its entirety as part of the present application.

TECHNICAL FIELD

The present disclosure relates to the technical field of building materials, particularly to a method for preparing a non-sintered shell-wrapped ceramsite using solid waste meanwhile immobilizing a heavy metal in river sediment, and a non-sintered river-sediment-based ceramsite.

BACKGROUND

Many large cities have dense populations, developed manufacturing industries, and severe pollution and siltation in their riverways, which adversely affects urban development and residents' safety. Moreover, dredging of riverways would incur high transportation and disposal costs. In addition, the development of urbanization, industrialization, and agricultural intensification has led to increased heavy metal contents in river sediment, and the toxicity of heavy metals (such as Pb, Cr, Cd, Zn) is long-lasting and non-degradable, making sediment a secondary pollution source. Therefore, the immobilization of heavy metals in river sediment is a prerequisite for achieving its resource utilization.

China is currently in a critical period of high-quality and rapid economic, social, and technological development. Major infrastructure projects and large-scale urbanization construction require a huge amount of concrete materials, consuming over 4 billion tons of natural aggregate annually. This leads to a shortage of non-renewable natural aggregate resources, and there is an urgent need to develop alternative, sustainable, and performance compliant artificial aggregates to replace natural aggregate resources. The river sediment contains a large quantity of $Al_2O_3$ and $SiO_2$, which have the potential to generate hydraulic hydration products and could be used as raw materials for ceramsite. At present, sintering is the main method to prepare river sediment into ceramsites, but this preparation process consumes a lot of energy and emits a large quantity of $CO_2$. Also, China's annual production of bulk industrial solid wastes such as fly ash, red mud, and steel slag reaches 3.6 billion tons, and the long-term storage thereof seriously pollutes water sources, soil, and atmospheric environment.

SUMMARY

An object of the present disclosure is to provide a method for preparing a non-sintered shell-wrapped ceramsite using solid waste meanwhile immobilizing a heavy metal in river sediment, and a non-sintered river-sediment-based shell-wrapped ceramsite. In the present disclosure, through treating waste with waste, the preparation of the non-sintered river-sediment-based shell-wrapped ceramsite is achieved, meanwhile achieving the immobilization of heavy metals in river sediment, and the safe, green, and resource utilization of solid wastes. The prepared non-sintered river-sediment-based shell-wrapped ceramsite has the advantages of high numerical tube pressure, high porosity, low cost, and sustainability.

In order to achieve the above-mentioned object, the present disclosure provides the following technical solutions: provided is a method for preparing a non-sintered shell-wrapped ceramsite using solid waste meanwhile immobilizing a heavy metal in river sediment, including the steps of (1) dehydrating the river sediment and compacting to obtain a dry cake-shaped residual soil, and grinding the dry cake-shaped residual soil, to obtain a dry powdery residual soil; (2) mixing the dry powdery residual soil with a solid waste powder and an alkali activating powder material, to obtain a mixture; (3) subjecting the mixture to first granulation, to obtain first grade cold-bonded ceramsites; (4) sieving the first grade cold-bonded ceramsites to obtain first grade cold-bonded ceramsites having a particle size of not less than 1 mm and not more than 3 mm, and first grade cold-bonded ceramsites having a particle size of larger than 3 mm but not more than 5 mm; and performing second granulation on the first grade cold-bonded ceramsites having a particle size of not less than 1 mm and not more than 3 mm, and the first grade cold-bonded ceramsites having a particle size of larger than 3 mm but not more than 5 mm, to obtain second grade cold-bonded ceramsites; and (5) mixing the second grade cold-bonded ceramsites with a sulfoaluminate cement and a Portland cement, and subjecting a resulting mixture to third granulation, to obtain a non-sintered river-sediment-based shell-wrapped ceramsite.

In some embodiments, the dry powdery residual soil has a particle size such that the dry powdery residual soil passes through a 180-mesh sieve.

In some embodiments, based on a total mass of the dry powdery residual soil, the solid waste powder, and the alkali activating powder material being 100%, a mass content of the dry powdery residual soil is in a range of 70-80%, a mass content of the solid waste powder is in a range of 15-25%, and a mass content of the alkali activating powder material is in a range of 5-10%.

In some embodiments, the solid waste powder includes fly ash, slag, steel slag, and red mud; and based on a total mass of the dry powdery residual soil, the solid waste powder, and the alkali activating powder material being 100%, a mass content of the fly ash is in a range of 10-12%, a mass content of the slag is in a range of 3-5%, a mass content of the steel slag is in a range of 4-5%, and a mass content of the red mud is in a range of 2-3%.

In some embodiments, the alkali activating powder material includes quicklime, sodium silicate, sodium hydroxide, and gypsum; and based on a total mass of the dry powdery residual soil, the solid waste powder, and the alkali activating powder material being 100%, a mass content of the quicklime is in a range of 2-3%, a mass content of the sodium silicate is in a range of 1-2%, a mass content of the sodium hydroxide is in a range of 1-3%, and a mass content of the gypsum is in a range of 1-2%.

In some embodiments, an adhesive is added during the first granulation and the second granulation.

In some embodiments, the adhesive is a mixed solution of water glass and water, and a mass concentration of the water glass in the adhesive is in a range of 5-10%, and the water glass has a modulus of 2.0.

In some embodiments, a mass ratio of the first grade cold-bonded ceramsites having a particle size of not less than 1 mm and not more than 3 mm to the first grade cold-bonded ceramsites having a particle size of larger than 3 mm but not more than 5 mm is in a range of (2-1):(1-2).

In some embodiments, a mass ratio of the sulfoaluminate cement to the Portland cement is in a range of (7-9):(3-1).

The present disclosure also provides a non-sintered river-sediment-based shell-wrapped ceramsite prepared by the method as described above, including a river sediment ceramsite, and a shell wrapped on a surface of the river sediment ceramsite, wherein the shell is formed from a composition including sulfoaluminate cement and Portland cement.

The present disclosure provides a method for preparing a non-sintered shell-wrapped ceramsite using solid waste meanwhile immobilizing a heavy metal in river sediment. The present disclosure combines river sediment with a solid waste powder and an alkali activating powder material, and adopts multiple-step granulations to realize particle size control and physical pore formation, thereby obtaining a non-sintered ceramsite. A sulfoaluminate cement and a Portland cement are used to encapsulate the non-sintered ceramsite and form a shell by wrapping, and a non-sintered river-sediment-based shell-wrapped ceramsite with internal porosity and dense shell is prepared. In the preparation process of the non-sintered river-sediment-based shell-wrapped ceramsite, heavy metals in the river sediment are immobilized by alkali activated hydration products by means of chemical adsorption and ion exchange reactions, and heavy metals could be further physically encapsulated by the dense shell. The present disclosure could effectively inhibit the leaching and diffusion of heavy metals in river sediment. In the present disclosure, through treating waste with waste, the preparation of the non-sintered river-sediment-based shell-wrapped ceramsite is achieved, meanwhile achieving the immobilization of heavy metals in river sediment, and the safe, green, and resource utilization of solid wastes.

Results in examples show that the non-sintered river-sediment-based shell-wrapped ceramsite prepared in the present disclosure has a numerical tube pressure of not less than 5 MPa, and a bulk density of 800-900 kg/m$^3$. Compared with ordinary sintered ceramsites, it has the characteristics of simple and easily-controlled preparation process, high production efficiency, low carbon emissions, and low energy consumption, and thus has high promotion and application value.

In some embodiments of the present disclosure, industrial solid wastes such as fly ash, slag, steel slag, and red mud are used as main raw materials to immobilize heavy metals in river sediment, which could achieve stable and harmless disposal of urban river sediment, reduce the production cost of ceramsites, save natural resources, and promote the large-scale resource utilization of industrial solid wastes, thereby effectively protecting the urban ecological environment.

In the present disclosure, industrial solid wastes such as alkali activated fly ash are used to chemically immobilize heavy metals, and a sulfoaluminate cement and a Portland cement are used to encapsulate ceramsite and form a shell by wrapping, such that the ceramsite has a porous internal structure and a dense shell. Through physical sealing, the leaching of heavy metals in the sediment is further reduced, thereby effectively suppressing the leaching and diffusion of heavy metals in the sediment while providing high numerical tube pressure.

The method for preparing a non-sintered river-sediment-based shell-wrapped ceramsite according to the present disclosure does not require high energy consumption processes such as calcination of raw materials, and is simple in preparation process, low in cost, and high in production efficiency. Also, the method has advantages of low energy consumption and no exhaust pollutions, which meets the objective requirements of sustainable development of building materials.

DETAILED DESCRIPTION OF THE EMBODIMENTS

The present disclosure provides a method for preparing a non-sintered shell-wrapped ceramsite using solid waste meanwhile immobilizing a heavy metal in river sediment, including the steps of (1) dehydrating the river sediment and compacting to obtain a dry cake-shaped residual soil, and grinding the dry cake-shaped residual soil, to obtain a dry powdery residual soil; (2) mixing the dry powdery residual soil with a solid waste powder and an alkali activating powder material, to obtain a mixture; (3) subjecting the mixture to first granulation, to obtain first grade cold-bonded ceramsites; (4) sieving the first grade cold-bonded ceramsites to obtain first grade cold-bonded ceramsites having a particle size of not less than 1 mm and not more than 3 mm, and first grade cold-bonded ceramsites having a particle size of larger than 3 mm but not more than 5 mm; performing second granulation on the first grade cold-bonded ceramsites having a particle size of not less than 1 mm and not more than 3 mm, and the first grade cold-bonded ceramsites having a particle size of larger than 3 mm but not more than 5 mm, to obtain second grade cold-bonded ceramsites; and (5) mixing the second grade cold-bonded ceramsites with a sulfoaluminate cement and a Portland cement, and subjecting a resulting mixture to third granulation, to obtain a non-sintered river-sediment-based shell-wrapped ceramsite.

In the present disclosure, the river sediment is dehydrated and compacted, to obtain a dry cake-shaped residual soil;

and the dry cake-shaped residual soil is ground to obtain a dry powdery residual soil. In some embodiments of the present disclosure, the river sediment is the river sediment obtained from urban dredging. In some embodiments of the present disclosure, the river sediment contains heavy metal elements, preferably including one or more of $Zn^{2+}$, $Pb^{2+}$, $Fe^{2+}$, $Cr^{3+}$, $Cd^{2+}$, $Ni^{3+}$, $Cu^{2+}$, $Mn^{2+}$, $Mg^{2+}$, and $Co^{3+}$.

In some embodiments of the present disclosure, the dehydration is performed by drying to a constant weight. In some embodiments of the present disclosure, the drying is performed at 105° C.

In some embodiments of the present disclosure, the grinding is carried out in a high-speed powder mill. In some embodiments, the grinding is performed at a rotation speed of 320,000 r/min. In some embodiments, the grinding is performed for 1 min.

In some embodiments of the present disclosure, the dry powdery residual soil has a particle size such that the dry powdery residual soil passes through a 180-mesh sieve.

In the present disclosure, after obtaining the dry powdery residual soil, the dry powdery residual soil is mixed with the solid waste powder and the alkali activating powder material to obtain a mixture. In some embodiments of the present disclosure, the mixing is performed by stirring. In some embodiments, the stirring is performed at a rotation speed of 32-48 r/min. In some embodiments, the stirring is performed for 5-10 min.

In some embodiments of the present disclosure, based on a total mass of the dry powdery residual soil, the solid waste powder, and the alkali activating powder material being 100%, a mass content of the dry powdery residual soil is in a range of 70-80%, and preferably 75%; a mass content of the solid waste powder is in a range of 15-25%, and preferably 19-22%; and a mass content of the alkali activating powder material is in a range of 5-10%, and preferably 6%.

In some embodiments of the present disclosure, the solid waste powder includes fly ash, slag, steel slag, and red mud. In some embodiments, based on a total mass of the dry powdery residual soil, the solid waste powder, and the alkali activating powder material being 100%, a mass content of the fly ash is in a range of 10-12%, a mass content of the slag is in a range of 3-5%, a mass content of the steel slag is in a range of 4-5%, and a mass content of the red mud is in a range of 2-3%.

In some embodiments of the present disclosure, the alkali activating powder material includes quicklime, sodium silicate, sodium hydroxide, and gypsum. In some embodiments, based on a total mass of the dry powdery residual soil, the solid waste powder, and the alkali activating powder material being 100%, a mass content of the quicklime is in a range of 2-3%, a mass content of the sodium silicate is in a range of 1-2%, a mass content of the sodium hydroxide is in a range of 1-3%, and a mass content of the gypsum is in a range of 1-2%.

In the present disclosure, after obtaining the mixture, the mixture is subjected to first granulation to obtain first grade cold-bonded ceramsites. In some embodiments of the present disclosure, an adhesive is added during the first granulation. In some embodiments of the present disclosure, the adhesive is a mixed solution of water glass and water. In some embodiments, a mass concentration of the water glass in the adhesive is in a range of 5-10%, preferably 8%. In some embodiments, the water glass has a modulus of 2.0. In some embodiments of the present disclosure, a mass ratio of the adhesive to the dry material during the first granulation is 1:2.

In some embodiments of the present disclosure, the first granulation is carried out in a granulator. In some embodiments, during the first granulation, a rotation angle of the granulator machine is in a range of 40-45°, and preferably 42°; a rotation speed thereof is in a range of 16-24 r/min, and preferably 18-20 r/min; and a rotation time is in a range of 10-20 min, and preferably 12-15 min. In some embodiments, an adhesive is evenly sprayed onto the mixture during the rotation.

In some embodiments of the present disclosure, the first grade cold-bonded ceramsites each have a particle size of 1-5 mm.

In the first granulation process of the present disclosure, heavy metal ions in the dry powdery residual soil combine with alkali activated products through chemical linkage and physical adsorption, thereby achieving the immobilization effect of heavy metals.

In the present disclosure, after obtaining first grade cold-bonded ceramsites, the first grade cold-bonded ceramsites are sieved to obtain first grade cold-bonded ceramsites having a particle size of not less than 1 mm and not more than 3 mm, and first grade cold-bonded ceramsites having a particle size of larger than 3 mm but not more than 5 mm; and a second granulation is then performed on the first grade cold-bonded ceramsites having a particle size of not less than 1 mm and not more than 3 mm, and the first grade cold-bonded ceramsites having a particle size of larger than 3 mm but not more than 5 mm, to obtain second grade cold-bonded ceramsites. In some embodiments of the present disclosure, the sieving is carried out using a square-hole sieve. In some embodiments of the present disclosure, a mass ratio of the first grade cold-bonded ceramsites having a particle size of not less than 1 mm and not more than 3 mm to the first grade cold-bonded ceramsites having a particle size of larger than 3 mm but not more than 5 mm is in a range of (2-1):(1-2), and preferably 1:1 to 2:1.

In some embodiments of the present disclosure, an adhesive is added during the second granulation. In some embodiments of the present disclosure, the adhesive is a mixed solution of water glass and water. In some embodiments, a mass concentration of the water glass in the adhesive is in a range of 5-10%, and preferably 8%. In some embodiments, the water glass has a modulus of 2.0. In some embodiments of the present disclosure, a mass ratio of the adhesive to the dry material during the second granulation is in a range of 1:1 to 1:3, and preferably 1:2.

In some embodiments of the present disclosure, the second granulation is carried out in a granulator. In some embodiments, during the second granulation, a rotation angle of the granulator is in a range of 40-45°, and preferably 42°; a rotation speed thereof is in a range of 16-24 r/min, and preferably 18-20 r/min; and a rotation time is in a range of 10-20 min, and preferably 15-18 min. In some embodiments, an adhesive is evenly sprayed onto the first grade cold-bonded ceramsites during the rotation.

In some embodiments of the present disclosure, the second grade cold-bonded ceramsites each have a particle size of 10-20 mm.

In the present disclosure, after obtaining the second grade cold-bonded ceramsites, the second grade cold-bonded ceramsites are mixed with a sulfoaluminate cement and a Portland cement, and the resulting mixture is subjected to third granulation, to obtain a non-sintered river-sediment-based shell-wrapped ceramsite. In some embodiments of the present disclosure, prior to mixing, the second grade cold-bonded ceramsites are subjected to curing process for 14 days. In some embodiments, the curing process is conducted in dry indoors. In some embodiments of the present disclosure, a mass ratio of the second grade cold-bonded ceramsites to the sulfoaluminate cement is in a range of 3:1 to 3:2, and preferably 3:1 to 3:1.6. In some embodiments of the present disclosure, a mass ratio of the sulfoaluminate cement to the Portland cement is in a range of (7-9):(3-1), and preferably 4:1 to 5:1. In some embodiments of the present disclosure, a water-to-cement-ratio (w/c) after mixing with the sulfoaluminate cement and the Portland cement is in a range of (0.35-0.45): 1. In the present disclosure, the sulfoaluminate cement is used as the shell wrapping material, and the Portland cement is used as a setting time-regulating material.

In some embodiments of the present disclosure, the third granulation is carried out in a granulator. In some embodiments of the present disclosure, the second grade cold-bonded ceramsites, the sulfoaluminate cement, and the Portland cement are simultaneously added into the granulator. In some embodiments, a rotation angle of the granulator during the third granulation is in a range of 40-45°; in some embodiments, a rotation speed of the granulator is in a range of 16-24 r/min; in some embodiments, a rotation time is in a range of 10-20 min; in some embodiments, water is evenly sprayed during the rotation. In the present disclosure, through the third granulation, the second grade cold-bonded ceramsites are encapsulated and wrapped by a shell, to obtain non-sintered river-sediment-based shell-wrapped ceramsites.

In some embodiments of the present disclosure, the shell-wrapped ceramsites obtained after the third granulation are further subjected to curing process, to obtain the non-sintered river-sediment-based shell-wrapped ceramsites. In some embodiments of the present disclosure, the curing process includes desiccating naturally for 7 days without direct sunlight irradiation.

The present disclosure also provides a non-sintered river-sediment-based shell-wrapped ceramsite prepared by the method as described in above technical solutions, including a river sediment ceramsite and a shell wrapped on a surface of the river sediment ceramsite, wherein the shell is formed from a composition comprising the sulfoaluminate cement and the Portland cement. In some embodiments of the present disclosure, the river sediment ceramsite has a porous structure. In some embodiments, the porous structure has a porosity of 20-50%, and preferably 35-50%. In some embodiments of the present disclosure, the shell is in a dense structure. In some embodiments, the shell has a thickness of 50-100 μm, and preferably 60-70 μm. In the present disclosure, the shell with hydration products has a dense structure and could act as a physical barrier of heavy metal leaching, and ettringite in the hydration products in the shell could also achieve chemical immobilization of heavy metals.

In some embodiments of the present disclosure, heavy metal ions immobilized in the non-sintered river-sediment-based shell-wrapped ceramsite include one or more of $Zn^{2+}$, $Pb^{2+}$, $Fe^{2+}$, $Cr^{3+}$, $Cd^{2+}$, $Ni^{3+}$, $Cu^{2+}$, $Mn^{2+}$, $Mg^{2+}$, and $Co^{3+}$.

In the present disclosure, river sediment after pre-treatment is mixed with a solid waste powder and an alkali activating powder material, to prepare the non-sintered river-sediment-based shell-wrapped ceramsite through cold bonding method. Based on the alkali activating method, the immobilization of heavy metals in river sediment and the formation of ceramsite with strength are achieved. This method is mature, reliable, and cost-effective. Through treating waste with waste, it achieves the immobilization of heavy metals in river sediment, the preparation of non-sintered river-sediment-based shell-wrapped ceramsite, and the safe, green, and resource utilization of solid waste.

The following will provide a clear and complete description of the technical solution of the present disclosure in conjunction with the examples. Obviously, the described examples are only a part of examples of the present disclosure, not all of them. Based on the examples in the present disclosure, all other examples obtained by ordinary technicians in the art without creative labor shall fall within the scope of the present disclosure.

Example 1

The river sediment obtained from urban dredging (initial heavy metal contents: $Cr^{3+}$-24.1 g/L, $Mn^{2+}$-7587.3 μg/L, $Fe^{2+}$-20111.0 μg/L, $Ni^{3+}$-186.5 μg/L, $Cu^{2+}$-172.7 μg/L, $Zn^{2+}$-2778.5 g/L, $Cd^{2+}$-21.4 μg/L, $Pb^{2+}$-17.3 μg/L) was placed in a constant-temperature oven, dried at 105° C. to a constant weight, dehydrated, and then compacted, to obtain a dry cake-shaped residual soil. The dry cake-shaped residual soil was placed into a high-speed powder mill, and ground at a rotation speed of 320,000 r/min for 1 min, obtaining a dry powdery residual soil with a particle size such that the dry powdery residual soil passed through a 180-mesh sieve.

7.0 kg of the dry powdery residual soil, 1.2 kg of fly ash, 0.5 kg of slag, 0.5 kg of steel slag, 0.3 kg of red mud, 0.2 kg of quicklime, 0.1 kg of gypsum, 0.1 kg of sodium hydroxide powder, and 0.1 kg of sodium silicate powder were mixed thoroughly, to obtain a mixture.

Figure 1:
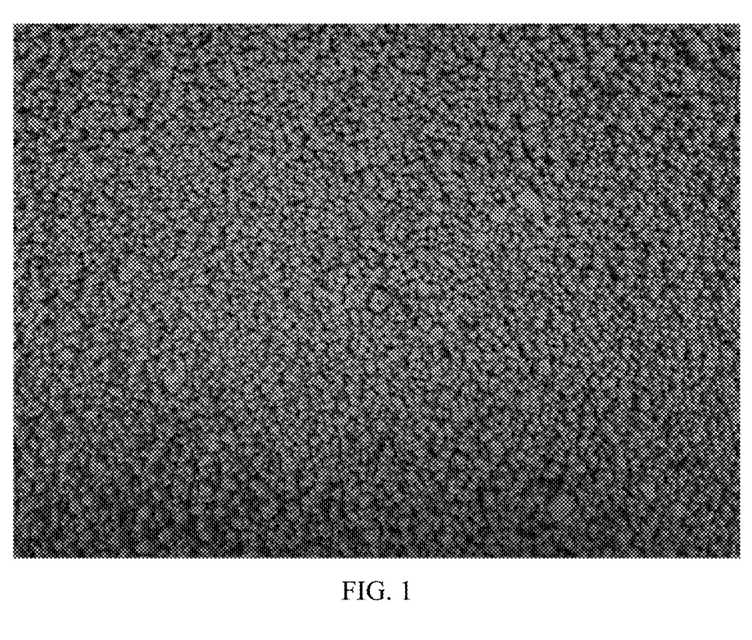
FIG. 1 shows a photo of first grade cold-bonded ceramsites.

1.0 kg of the mixture was placed into a granulator each time, and 0.5 kg of an adhesive was sprayed thereto, and the resulting mixture was subjected to first granulation, wherein the adhesive was a mixed solution of water glass and water, and the mass concentration of the water glass in the adhesive was 5%, and the modulus of the water glass was 2.0. The rotation angle of the granulator was 42°, the rotation speed thereof was 20 r/min, and the rotation time was 12 min, forming first grade cold-bonded ceramsites (see FIG. 1). The first grade cold-bonded ceramsites were sieved with a square-hole sieve, to obtain first grade cold-bonded ceramsites having a particle size of not less than 1 mm and not more than 3 mm, and first grade cold-bonded ceramsites having a particle size of larger than 3 mm but not more than 5 mm.

Figure 2:
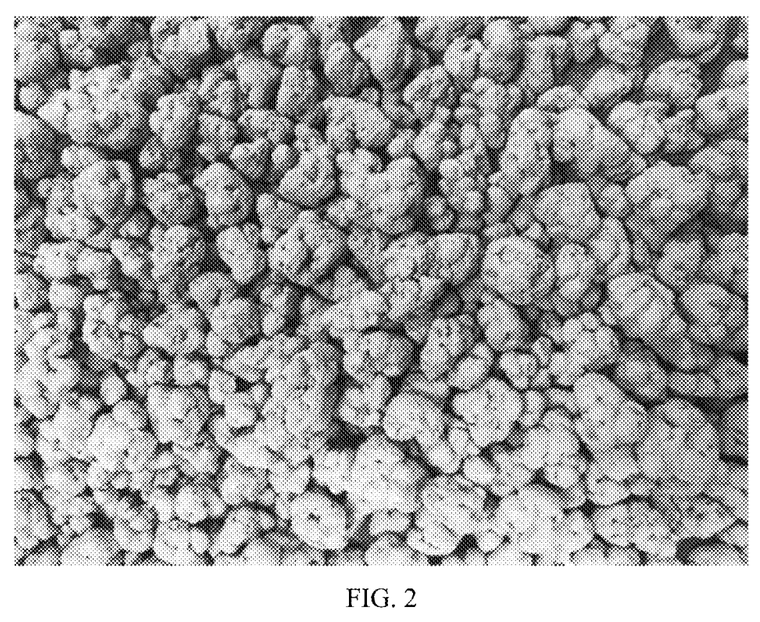
FIG. 2 shows a photo of second grade cold-bonded ceramsites.

1.0 kg of the first grade cold-bonded ceramsites with two particle size distributions (a mass ratio of the first grade cold-bonded ceramsites having a particle size of not less than 1 mm and not more than 3 mm to the first grade cold-bonded ceramsites having a particle size of larger than 3 mm but not more than 5 mm being 1:1) was placed into a granulator, and 0.5 kg of an adhesive was sprayed thereto. The resulting mixture was subjected to second granulation, wherein the adhesive was a mixed solution of water glass and water, and the mass concentration of the water glass in the adhesive was 5%, and the modulus of the water glass was 2.0. The rotation angle of the granulator was 42°, the rotation speed thereof was 20 r/min, and the rotation time was 15 min, forming second grade cold-bonded ceramsites (see FIG. 2).

Figure 3:
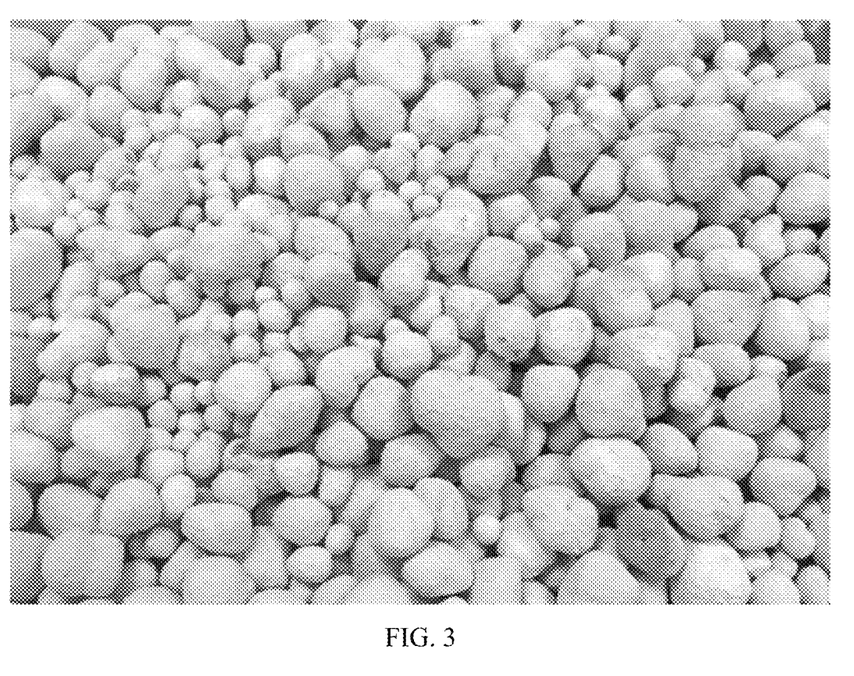
FIG. 3 shows a photo of non-sintered river-sediment-based shell-wrapped ceramsites.
Figure 4:
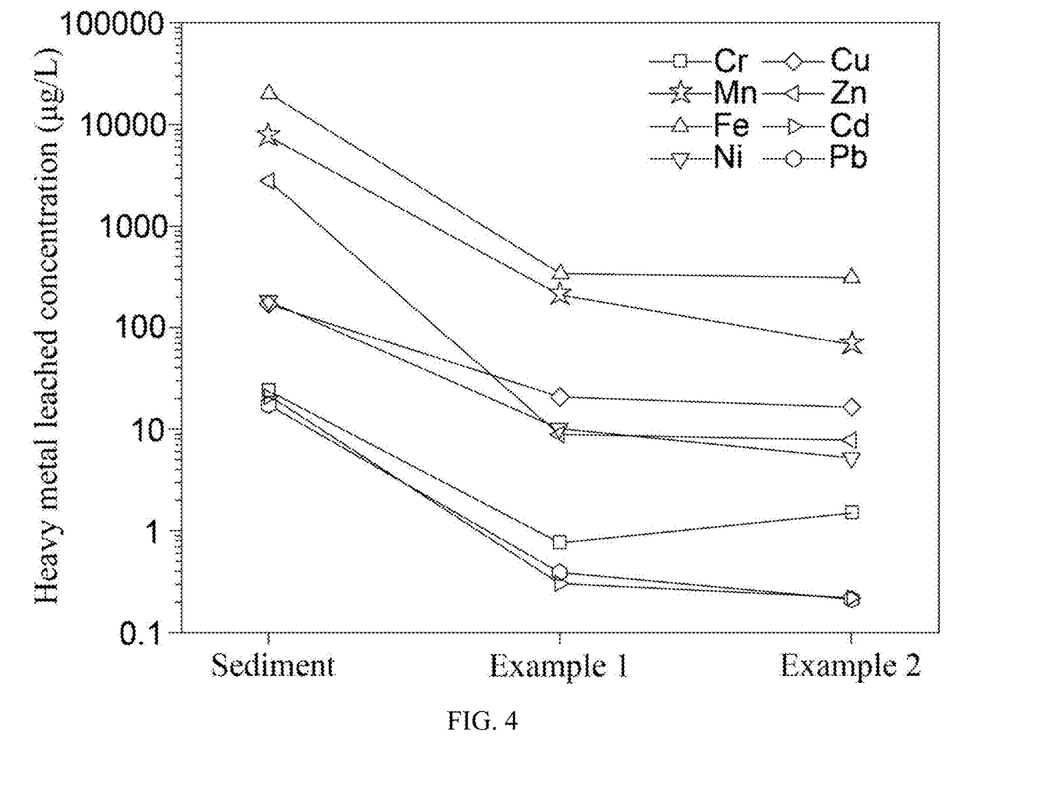
FIG. 4 shows effects of the amount of the solid waste powder added and shell thickness on heavy metal leaching from river sediment.

The second grade cold-bonded ceramsites were subjected to natural curing process for 14 days. 1.5 kg of the second grade cold-bonded ceramsites were then used as the core, 0.5 kg of a sulfoaluminate cement and 0.1 kg of a Portland cement were used as the shell material, and 0.24 kg of water was evenly sprayed thereto. The second grade cold-bonded ceramsites were encapsulated and wrapped by a shell, to obtain non-sintered shell-wrapped ceramsites. After 7 days of natural curing process, the non-sintered river-sediment-based shell-wrapped ceramsites were obtained (see FIG. 3). The non-sintered river-sediment-based shell-wrapped ceramsites prepared in this example have a shell thickness of 60 m; and the porosity of the porous structure is 35%.

Example 2

The river sediment obtained from urban dredging (initial heavy metal contents: $Cr^{3+}$-24.1 g/L, $Mn^{2+}$-7587.3 μg/L, $Fe^{2+}$-20111.0 μg/L, $Ni^{3+}$-186.5 μg/L, $Cu^{2+}$-172.7 μg/L, $Zn^{2+}$-2778.5 g/L, $Cd^{2+}$-21.4 μg/L, $Pb^{2+}$-17.3 μg/L) was placed in a constant-temperature oven, dried at 105° C. to a constant weight, dehydrated, and then compacted, to obtain a dry cake-shaped residual soil. The dry cake-shaped residual soil was placed into a high-speed powder mill and ground at a rotation speed of 320,000 r/min for 1 min, obtaining a dry powdery residual soil with a particle size such that the dry powdery residual soil passed through a 180-mesh sieve.

7.5 kg of the dry powdery residual soil, 1.0 kg of fly ash, 0.3 kg of slag, 0.4 kg of steel slag, 0.2 kg of red mud, 0.2 kg of quicklime, 0.1 kg of gypsum, 0.1 kg of sodium hydroxide powder, and 0.2 kg of sodium silicate powder were mixed thoroughly, to obtain a mixture.

1.0 kg of the mixture was placed into a granulator each time, and 0.5 kg of an adhesive was sprayed thereto, and the resulting mixture was subjected to first granulation, wherein the adhesive was a mixed solution of water glass and water, and the mass concentration of the water glass in the adhesive was 8%, and the modulus of the water glass was 2.0. The rotation angle of the granulator was 40°, the rotation speed thereof was 18 r/min, and the rotation time was 15 min, forming first grade cold-bonded ceramsites. The first grade cold-bonded ceramsites were sieved with a square-hole sieve, to obtain first grade cold-bonded ceramsites having a particle size of not less than 1 mm and not more than 3 mm, and first grade cold-bonded ceramsites having a particle size of larger than 3 mm but not more than 5 mm.

1.0 kg of the first grade cold-bonded ceramsites with two particle size distributions (a mass ratio of the first grade cold-bonded ceramsites having a particle size of not less than 1 mm and not more than 3 mm to the first grade cold-bonded ceramsites having a particle size of larger than 3 mm but not more than 5 mm being 2:1) was placed into a granulator, and 0.5 kg of an adhesive was sprayed thereto, and the resulting mixture was subjected to second granulation, wherein the adhesive was a mixed solution of water glass and water, and the mass concentration of the water glass in the adhesive was 8%, and the modulus of the water glass was 2.0. The rotation angle of the granulator was 40°, the rotation speed thereof was 18 r/min, and the rotation time was 18 min, forming second grade cold-bonded ceramsites.

The second grade cold-bonded ceramsites were subjected to natural curing process for 14 days. 1.5 kg of the second grade cold-bonded ceramsites after natural curing process were then used as the core, 0.8 kg of a sulfoaluminate cement and 0.2 kg of a Portland cement were used as the shell material, and 0.35 kg of water was evenly sprayed thereto. The second grade cold-bonded ceramsites were encapsulated and wrapped by a shell, to obtain non-sintered shell-wrapped ceramsites. After 7 days of natural curing process, the non-sintered river-sediment-based shell-wrapped ceramsites were obtained. The non-sintered river-sediment-based shell-wrapped ceramsites prepared in this example have a shell thickness of 70 m; and the porosity of the porous structure is 25%.

Comparative Example 1

10.00 kg of river sediment was taken, 3.00 kg of fly ash and 0.20 kg of quicklime were added thereto, and they were stirred for 30 min. The resulting mixture was then introduced into a plate and frame filter press and dehydrated therein. When the moisture content dropped to 40% or lower, the remaining soil was then fully crushed and stirred in a pulvimixer, until being crushed to 100 mesh, to obtain primary sediment particles with a particle size of 1-3 mm. 2 kg of the primary sediment particles were used as raw materials, 0.20 kg of a water glass solution (with a mass percentage of 45%) was added thereto as an adhesive, and a resulting mixture was subjected to second granulation on a rolling granulator, to form secondary sediment particles with many pores and a particle size of 8-10 mm. Using 2 kg of the secondary sediment particles as the core material and 0.60 kg of sulfoaluminate material as the shell material, sediment particles after multiple-step granulations were placed in a shot blasting machine and wrapped through particle wrapping technology, wherein a water glass solution (with a mass percentage of 45%) was sprayed in synchrony with adding the shell material until surfaces of the particles were completely wetted, so that the shell material mixture evenly wrapped around surfaces of the ceramsites, obtaining non-sintered shell-wrapped ceramsites. The sulfoaluminate material had a strength grade of 42.50, a specific surface area of 370 $m^2$/kg, an initial setting time of 38 min, a final setting time of 200 min, a 7-day free expansion rate of 0.07%, and a standard consistency of 30%. The surfaces of the sediment ceramsites were coated with a film and water was sprinkled thereon every 12th hour. After 7 days of curing process, the sediment ceramsites were naturally desiccated at 23° C., without direct sunlight irradiation, finally obtaining a non-sintered shell-wrapped ceramsite finish product.

Comparative Example 2

3.00 kg of river sediment was taken, 0.35 kg of slag and 0.05 kg of sodium hydroxide were added thereto, and they were stirred for 10 min. The resulting mixture was introduced into a plate and frame filter press and dehydrated therein. When the moisture content dropped to 40% or lower, the remaining soil was fully crushed and stirred in a pulvimixer, until being crushed to 100 mesh, obtaining primary sediment particles with a particle size of 1-3 mm. 0.5 kg of primary sediment particles were used as the raw material, 0.05 kg of a water glass solution (with a mass percentage of 35%) was then added thereto as an adhesive, and a resulting mixture was subjected to second granulation on a rolling granulator, forming secondary sediment particles with many pores and a particle size of 8-10 mm. Using 0.25 kg of secondary sediment particles as the core material and 0.15 kg of sulfoaluminate material as the shell material, sediment particles after multiple-step granulations were placed in a shot blasting machine and wrapped through particle wrapping technology, wherein a water glass solution (with a mass percentage of 35%) was sprayed in synchrony with adding the shell material until surfaces of the particles were completely wetted, so that the shell material mixture evenly wrapped around surfaces of the ceramsites, obtaining non-sintered shell-wrapped ceramsites. The sulfoaluminate material had a strength grade of 42.50, a specific surface area of 350 m²/kg, an initial setting time of 28 min, a final setting time of 180 min, a 7-day free expansion rate of 0.02%, and a standard consistency of 25%. The surfaces of the sediment ceramsites were coated with a film and water was sprinkled thereon every 12th hour. After 7 days of curing process, the sediment ceramsites were naturally desiccated at 17° C., without direct sunlight irradiation, finally obtaining a non-sintered shell-wrapped ceramsite finish product.

Comparative Example 3

5.00 kg of river sediment was taken, 1.00 kg of volcanic ash and 0.10 kg of quicklime were added thereto, and they were stirred for 15 min. The resulting mixture was introduced into a plate and frame filter press and dehydrated therein. When the moisture content dropped to 40% or lower, the remaining soil was fully crushed and stirred in a pulvimixer, until being crushed to 100 mesh, obtaining primary sediment particles with a particle size of 1-3 mm. 1.5 kg of primary sediment particles were used as the raw material, 0.10 kg of a water glass solution (with a mass percentage of 40%) was added thereto as an adhesive, and a resulting mixture was subjected to second granulation on a rolling granulator, to form secondary sediment particles with many pores and a particle size of 8-10 mm. Using 1 kg of the secondary sediment particles as the core material and 0.25 kg of sulfoaluminate material as the shell material, sediment particles after multiple-step granulations were placed in a shot blasting machine and wrapped through particle wrapping technology, wherein a water glass solution (with a mass percentage of 40%) was sprayed in synchrony with adding the shell material, until the particle surface was completely wetted, so that the shell material mixture evenly wrapped around surfaces of the ceramsites, obtaining non-sintered shell-wrapped ceramsites. The sulfoaluminate material had a strength grade of 42.50, a specific surface area of 358 m²/kg, an initial setting time of 30 min, a final setting time of 200 min, a 7-day free expansion rate of 0.10%, and a standard consistency of 27%. The surfaces of the sediment ceramsites were coated with a film and water was sprinkled thereon every 12th hour. After 7 days of curing process, the sediment ceramsites were naturally desiccated at 20° C., without direct sunlight irradiation, finally obtaining a non-sintered shell-wrapped ceramsite finish product.

Test: performance characterizations of the non-sintered river-sediment-based shell-wrapped ceramsites Properties of the non-sintered river-sediment-based shell-wrapped ceramsites were analyzed by determining bulk density, numerical tube pressure, 1-hour water absorption rate, and heavy metal leaching, indicating that non-sintered shell-wrapped ceramsite with high porosity and strength, as well as good heavy metal immobilization effect had been prepared in the present disclosure.

(1) Bulk Density

Samples of the non-sintered river-sediment-based shell-wrapped ceramsites were placed in a drying oven and dried therein to a constant weight. The non-sintered river-sediment-based shell-wrapped ceramsites were evenly poured from 50 mm above the container mouth, so that the samples fell naturally without touching the capacity cylinder. After filling, the upper part of the samples at the mouth of the capacity cylinder were in a conical shape, and then scraped to be flat using a ruler from the center to both sides along the edge of the capacity cylinder. The depression on the surface was filled and leveled up with non-sintered river-sediment-based shell-wrapped ceramsites with smaller particle size.

After that, they as a whole were weighed. Calculation was conducted according to Equation I.

$$\rho_{bv} = \frac{(m_t - m_v) \times 1000}{V},\qquad \text{Equation I}$$

wherein in Equation I, $\rho_{bv}$ represents bulk density, in unit of kilogram per cubic meter (kg/m³);

$m_t$ represents the total mass of the samples and the capacity cylinder, in unit of kilogram (kg);

$m_v$ represents the mass of the capacity cylinder, in unit of kilogram (kg); and V represents the capacity of the capacity cylinder, in unit of liter (L).

(2) Numerical Tube Pressure

Samples of the non-sintered river-sediment-based shell-wrapped ceramsites having a particle size of 10-20 mm were obtained by sieving, among which the volume content of samples with a particle size of 10-15 mm was 60%. A pressure-bearing cylinder was loaded with the samples to a height higher than the cylinder mouth, placed on a vibration table for 3 seconds, then loaded with the samples to a height higher than the cylinder mouth, and placed on the vibration table for 5 seconds. The samples therein were scraped to be flat along the cylinder mouth. The guide cylinder and stamping die were installed, such that the lower scale line of the stamping die was aligned with the upper edge of the guide cylinder. The pressure-bearing cylinder was placed on the lower pressure plate of the press, to be aligned with the center of the pressure plate. A load was applied and increased at a constant speed of 300 N per second. When the stamping die was pressed to a pressing depth of 20 mm, and the pressure value was recorded. Calculation was conducted according to Equation II:

$$f_a = P/F \qquad \text{Equation II,}$$

wherein in Equation II, $f_a$ represents the numerical tube pressure of samples of non-sintered river-sediment-based shell-wrapped ceramsites, in unit of MPa;

P represents pressure value when the pressing depth is 20 mm, in unit of Newton (N); and F represents pressure-bearing area, in unit of square millimeter (mm²).

(3) Water Absorption Rate

Samples of the non-sintered river-sediment-based shell-wrapped ceramsites were placed in a drying oven and dried therein at 80° C. to a constant weight. The dried ceramsites were immersed in water for 1 hour, and the weight changes thereof were measured. The arithmetic mean of three measured values was taken as the experimental result. Calculation was conducted according to Equation III, $$w_a = \frac{m_0 - m_1}{m_1} \times 100, \qquad \text{Equation III}$$

wherein in Equation III, $w_a$ represents 1-hour water absorption rate of coarse aggregate samples of non-sintered river-sediment-based shell-wrapped ceramsites, %;

$m_0$ represents the mass of samples after being immersed in water, in unit of gram (g); and $m_1$ represents the mass of dried samples, in unit of gram (g).

(4) Heavy Metal Leaching—Toxicity Characteristic Leaching Procedure (TCLP)

5.7 mL of glacial acetic acid was dissolved in deionized water, and water was supplemented to a marked volume of 1 L, to obtain an acidic leaching solution. The pH value of the acidic leaching solution was maintained within the range of 2.88±0.05. Samples of the non-sintered river-sediment-based shell-wrapped ceramsites were placed in a drying oven and dried at 80° C. to a constant weight. 75 g of the dry powdery residual soil and 75 g of the samples of the non-sintered river-sediment-based shell-wrapped ceramsites were separately placed into the acidic leaching solution in a solid-liquid mass ratio of 1:20. After tightly closing the bottle cap, the bottle was fixed in a flip-type oscillator equipment, with a rotation speed of 30 r/min, a temperature of 25° C., and a rotation time of 18 h.

A heavy metal solution obtained after leaching for 18 h was filtered with 0.65 μm microporous filter membrane, and the filtrate was tested using inductively coupled plasma mass spectrometry (ICP-MS), to obtain data on heavy metal leaching.

Based on the data obtained above, the immobilization rate of heavy metals was calculated according to Equation IV:

$$S_h = \frac{m_a - m_p}{m_a},\quad \text{Equation IV}$$

wherein in Equation IV, $S_h$ represents immobilization rate of heavy metals, %;
$m_a$ represents heavy metal leaching amount from the dry powdery residual soil, %; and
$m_p$ represents heavy metal leaching amount from the non-sintered river-sediment-based shell-wrapped ceramsites, %.

Among them, the heavy metal leaching amount could be directly obtained by ICP testing.

Figure 5:
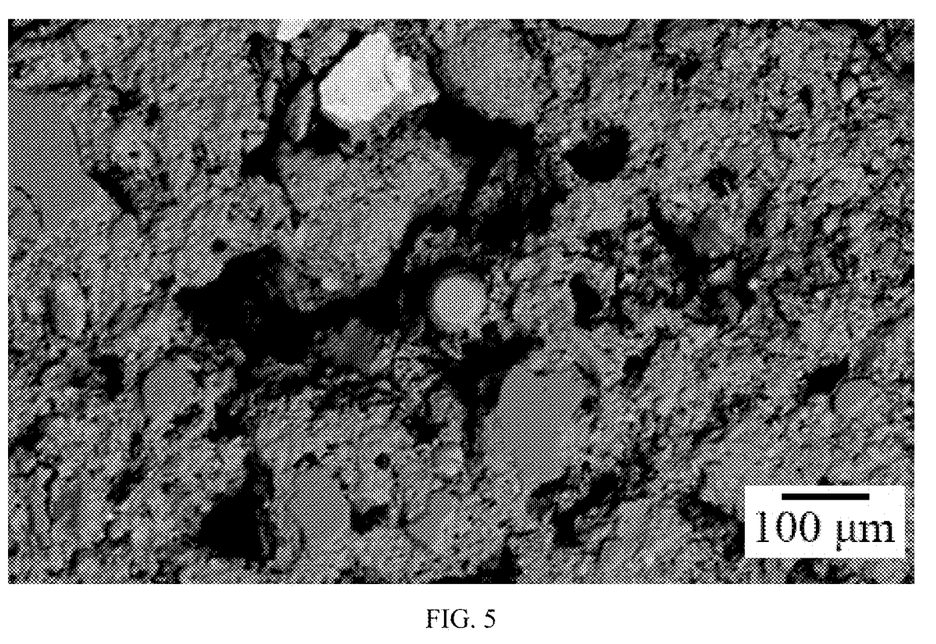
FIG. 5 shows micromorphology of the internal pore structure of the non-sintered river-sediment-based shell-wrapped ceramsite.

(5) Mechanism Analysis of Heavy Metal Immobilization by Alkali-Activated Solid Waste A sample of the non-sintered river-sediment-based shell-wrapped ceramsite in Example 1 was cut and polished. After drying, the internal pore structure (see FIG. 5) and interface surface morphology (see FIG. 6) thereof were observed through field emission environmental scanning electron microscopy. The element distribution therein was analyzed through energy spectrum. It was observed that heavy metals inside the sediment had been effectively immobilized by the alkali activating material. The dense sulfoaluminate/Portland cement shell could provide further seal effect (see FIG. 7A to FIG. 7E).

(6) Experimental Results:

The non-sintered river-sediment-based shell-wrapped ceramsites prepared in Example 1 has a bulk density of 835 kg/m³. The non-sintered river-sediment-based shell-wrapped ceramsites prepared in Example 2 has a bulk density of 868 kg/m³, which meet the China national standard of the 900 grade ceramsite. The non-sintered shell-wrapped ceramsite finish product prepared in Comparative Example 1 has a bulk density of 1350 kg/m³, the non-sintered shell-wrapped ceramsite finish product prepared in Comparative Example 2 has a bulk density of 1200 kg/m³, and the non-sintered shell-wrapped ceramsite finish product prepared in Comparative Example 3 has a bulk density of 1265 kg/m³.

The numerical tube pressure of the non-sintered river-sediment-based shell-wrapped ceramsites prepared in Example 1 is 6.1 MPa. The numerical tube pressure of the non-sintered river-sediment-based shell-wrapped ceramsites prepared in Example 2 is 6.5 MPa, which meet the China national standard of the 900 grade ceramsite, i.e., requiring a numerical tube pressure higher than 5.0 MPa. The numerical tube pressure of the non-sintered shell-wrapped ceramsite finish product prepared in Comparative Example 1 is 4.0 MPa, the numerical tube pressure of the non-sintered shell-wrapped ceramsite finish product prepared in Comparative Example 2 is 3.5 MPa, and the numerical tube pressure of the non-sintered shell-wrapped ceramsite finish product prepared in Comparative Example 3 is 3.7 MPa.

The 1-hour water absorption rate of the non-sintered river-sediment-based shell-wrapped ceramsites prepared in Example 1 is 20%; the 1-hour water absorption rate of the non-sintered river-sediment-based shell-wrapped ceramsites prepared in Example 2 was 17%, indicating excellent performance. The 1-hour water absorption rate of the non-sintered shell-wrapped ceramsite finish product prepared in Comparative Example 1 is 19%, the 1-hour water absorption rate of the non-sintered shell-wrapped ceramsite finish product prepared in Comparative Example 2 is 18%, and the 1-hour water absorption rate of the non-sintered shell-wrapped ceramsite finish product prepared in Comparative Example 3 is 18.5%.

Figure 6:
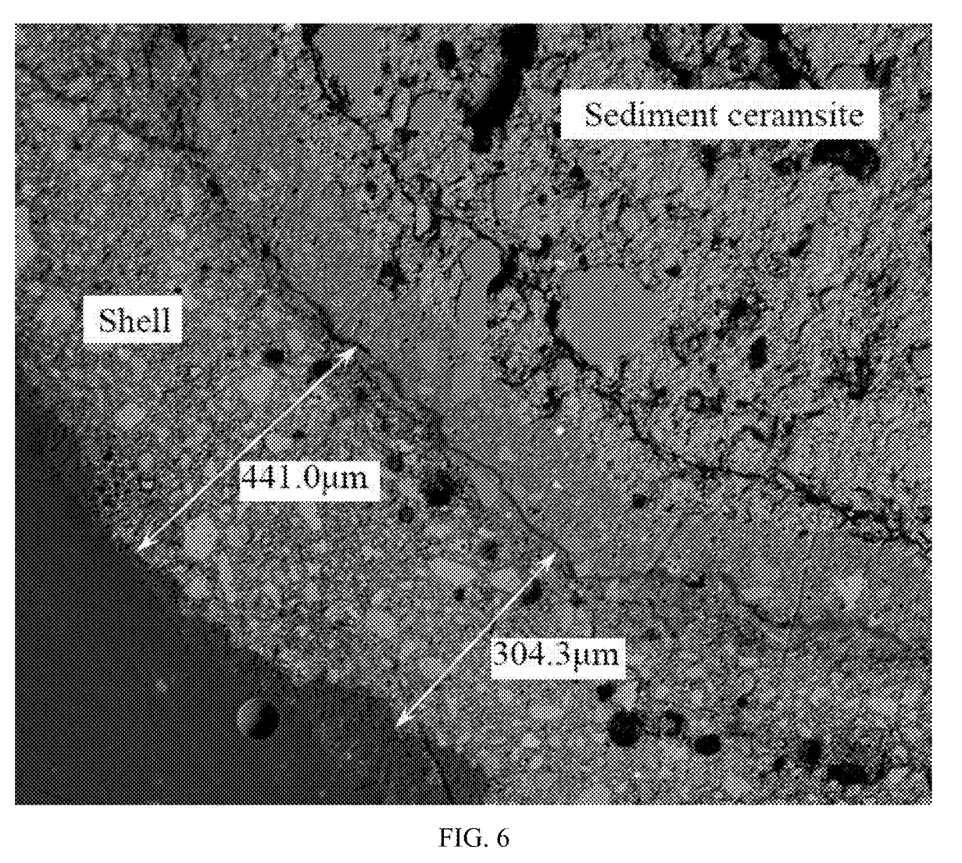
FIG. 6 shows micromorphology of the shell interface of the non-sintered river-sediment-based shell-wrapped ceramsite.
Figure 7A:
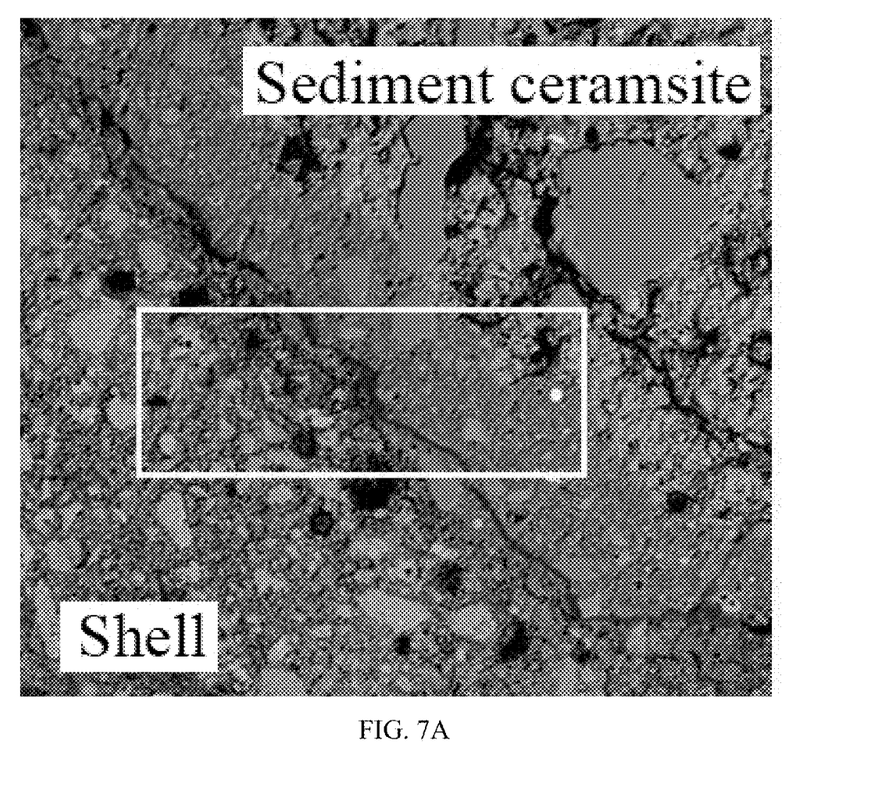
FIG. 7A to FIG. 7E show energy spectra of heavy metal elements at the interface of the non-sintered river-sediment-based shell-wrapped ceramsite.
Figure 7B:
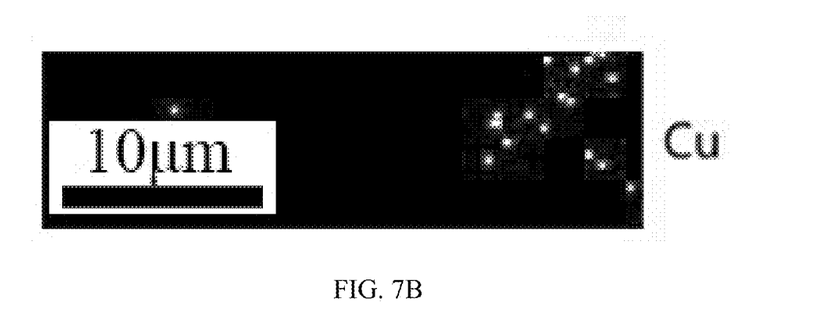
Figure 7C:
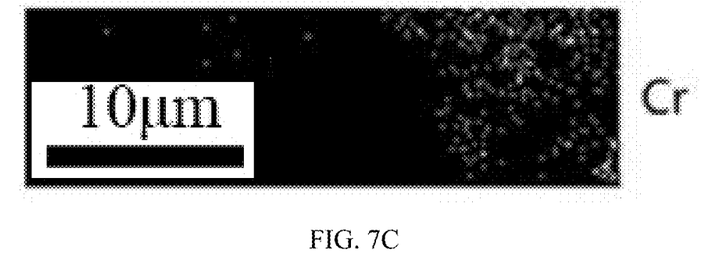
Figure 7D:
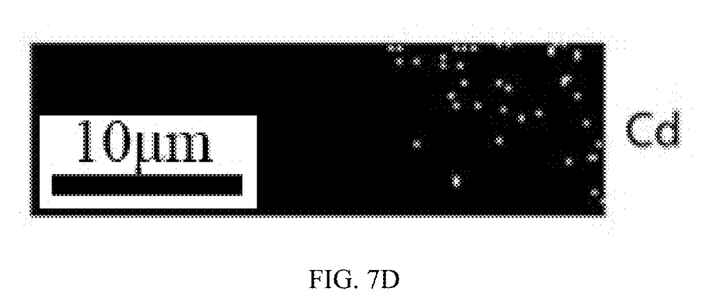
Figure 7E:
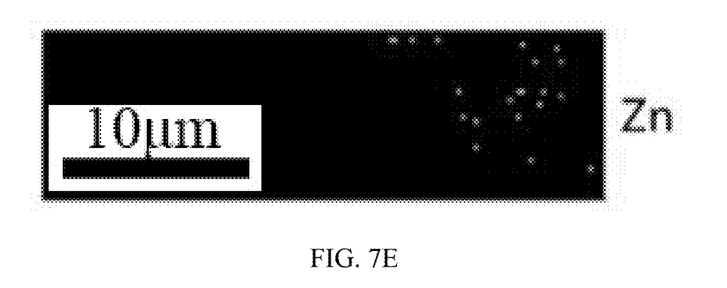
Figure 8:
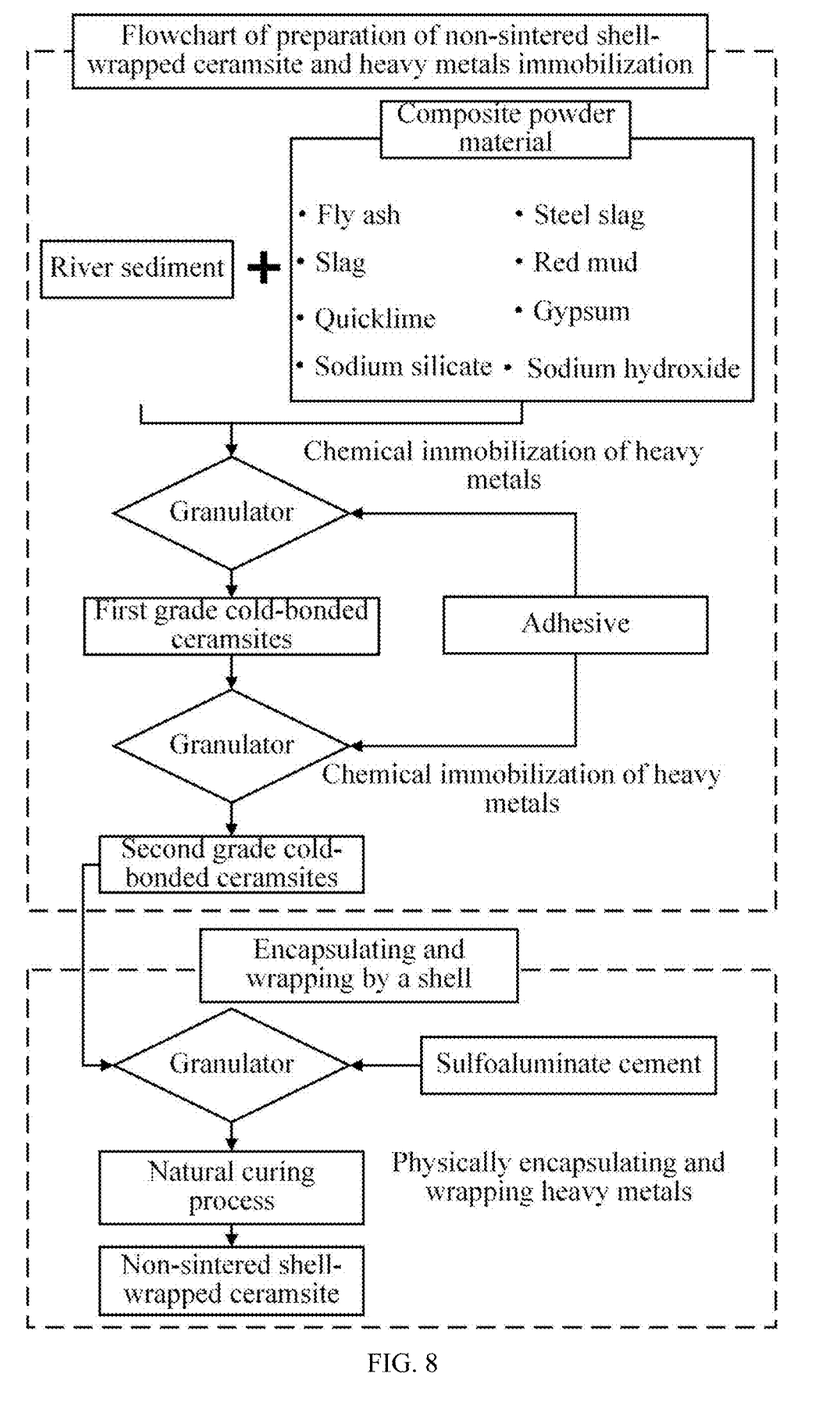
FIG. 8 shows a flowchart of the method for preparing the non-sintered river-sediment-based shell-wrapped ceramsite in an embodiment of the present disclosure.

Heavy metals immobilization effect: FIG. 6 shows effects of the amount of the solid waste powder added and shell thickness on heavy metal leaching from river sediment. As can be seen from FIG. 6, the immobilization rates of heavy metals in river sediment by the non-sintered river-sediment-based shell-wrapped ceramsites prepared in Example 1 (Example 1) rank from highest to lowest as follows: $Zn^{2+}$ (99.7%)>$Cd^{2+}$(98.6%)>$Fe^{2+}$(98.3%)>$Pb^{2+}$(97.7%)>$Mn^{2+}$ (97.2%)>$Cr^{3+}$(96.8%)>$Ni^{3+}$(94.5%)>$Cu^{2+}$(88.1%). Example 2 has a better heavy metal immobilization effect. Heavy metals are immobilized inside the non-sintered river-sediment-based shell-wrapped ceramsites, and the dense sulfoaluminate cement shell could effectively inhibit the leaching of heavy metals in river sediment. The immobilization rate of heavy metals in river sediment by the non-sintered river-sediment-based shell-wrapped ceramsites prepared in Example 2 (Example 2) ranks from highest to lowest as follows: $Zn^{2+}$(99.7%)>$Mn^{2+}$(99.1%)>$Cd^{2+}$ (99.0%)>$Pb^{2+}$(98.8%)>$Fe^{2+}$(98.4%)>$Ni^{3+}$(97.2%)>$Cr^{3+}$ (93.8%)>$Cu^{2+}$(90.6%). The immobilization rates of heavy metals in river sediment by the non-sintered shell-wrapped ceramsite finish product prepared in Comparative Example 1 rank from highest to lowest as follows: $Zn^{2+}$ (95.3%)>$Mn^{2+}$(92.4%)>$Cd^{2+}$(91.5%)>$Pb^{2+}$(89.8%)>$Fe^{2+}$ (87.6%)>$Ni^{3+}$(86.1%)>$Cr^{3+}$(85.3%)>$Cu^{2+}$(84.5%). The immobilization rate of heavy metals in river sediment by the non-sintered shell-wrapped ceramsite finish product prepared in Comparative Example 2 ranks from highest to lowest as follows: $Zn^{2+}$(92.8%)>$Mn^{2+}$(90.0%)>$Cd^{2+}$ (89.5%)>$Pb^{2+}$(87.6%)>$Fe^{2+}$(85.7%)>$Ni^{3+}$(84.2%)>$Cr^{3+}$ (83.7%)>$Cu^{2+}$(82.2%). The immobilization rate of heavy metals in river sediment by the non-sintered shell-wrapped ceramsite finish product prepared in Comparative Example 3 ranks from highest to lowest as follows: $Zn^{2+}$ (93.5%)>$Mn^{2+}$(90.1%)>$Cd^{2+}$(89.8%)>$Pb^{2+}$(88.4%)>$Fe^{2+}$ (86.4%)>$Ni^{3+}$(85.2%)>$Cr^{3+}$(84.7%)>$Cu^{2+}$(82.5%).

The above are only preferred embodiments of the present disclosure. It should be pointed out that for ordinary technicians in the art, several improvements and embellishments could be made without departing from principles of the present disclosure, and these improvements and embellishments should fall within the scope of the present disclosure.

What is claimed is:

1. A method for preparing a non-sintered river-sediment-based shell-wrapped ceramsite using solid waste meanwhile immobilizing a heavy metal in river sediment, comprising the steps of:
   (1) dehydrating the river sediment and compacting to obtain a dry cake-shaped residual soil, and grinding the dry cake-shaped residual soil, to obtain a dry powdery residual soil;
   (2) mixing the dry powdery residual soil with a solid waste powder and an alkali activating powder material, to obtain a mixture;
   (3) subjecting the mixture to a first granulation, to obtain first grade cold-bonded ceramsites;
   (4) sieving the first grade cold-bonded ceramsites to obtain first grade cold-bonded ceramsites having a particle size of not less than 1 mm and not more than 3 mm, and first grade cold-bonded ceramsites having a particle size of larger than 3 mm but not more than 5 mm, and performing a second granulation on the first grade cold-bonded ceramsites having a particle size of not less than 1 mm and not more than 3 mm, and the first grade cold-bonded ceramsites having a particle size of larger than 3 mm but not more than 5 mm, to obtain second grade cold-bonded ceramsites, wherein a mass ratio of the first grade cold-bonded ceramsites having a particle size of not less than 1 mm and not more than 3 mm to the first grade cold-bonded ceramsites having a particle size of larger than 3 mm but not more than 5 mm is in a range of (2-1):(1-2); and
   (5) mixing the second grade cold-bonded ceramsites with a sulfoaluminate cement and a Portland cement, and subjecting a resulting mixture to a third granulation, to obtain the non-sintered river-sediment-based shell-wrapped ceramsite,
   wherein based on a total mass of the dry powdery residual soil, the solid waste powder, and the alkali activating powder material being 100%, a mass content of the dry powdery residual soil is in a range of 70-80%, a mass content of the solid waste powder is in a range of 15-25%, and a mass content of the alkali activating powder material is in a range of 5-10%;
   an adhesive is added during the first granulation and the second granulation;
   a mass ratio of the sulfoaluminate cement to the Portland cement is in a range of (7-9):(3-1); and
   a mass ratio of the second grade cold-bonded ceramsites to the sulfoaluminate cement is in a range of 3:1 to 3:2.

2. The method as claimed in claim 1, wherein the dry powdery residual soil has a particle size such that the dry powdery residual soil passes through a 180-mesh sieve.

3. The method as claimed in claim 1, wherein the solid waste powder comprises fly ash, slag, steel slag, and red mud; and
   based on a total mass of the dry powdery residual soil, the solid waste powder, and the alkali activating powder material being 100%, a mass content of the fly ash is in a range of 10-12%, a mass content of the slag is in a range of 3-5%, a mass content of the steel slag is in a range of 4-5%, and a mass content of the red mud is in a range of 2-3%.

4. The method as claimed in claim 1, wherein the alkali activating powder material comprises quicklime, sodium silicate, sodium hydroxide, and gypsum; and
   based on a total mass of the dry powdery residual soil, the solid waste powder, and the alkali activating powder material being 100%, a mass content of the quicklime is in a range of 2-3%, a mass content of the sodium silicate is in a range of 1-2%, a mass content of the sodium hydroxide is in a range of 1-3%, and a mass content of the gypsum is in a range of 1-2%.

5. The method as claimed in claim 1, wherein the adhesive is a mixed solution of water glass and water, and
   a mass concentration of the water glass in the adhesive is in a range of 5-10%, and the water glass has a modulus of 2.0.

* * * * *